INVENTOR.
Attilio R. Spicacci
BY Robert K. Youtie
ATTORNEY.

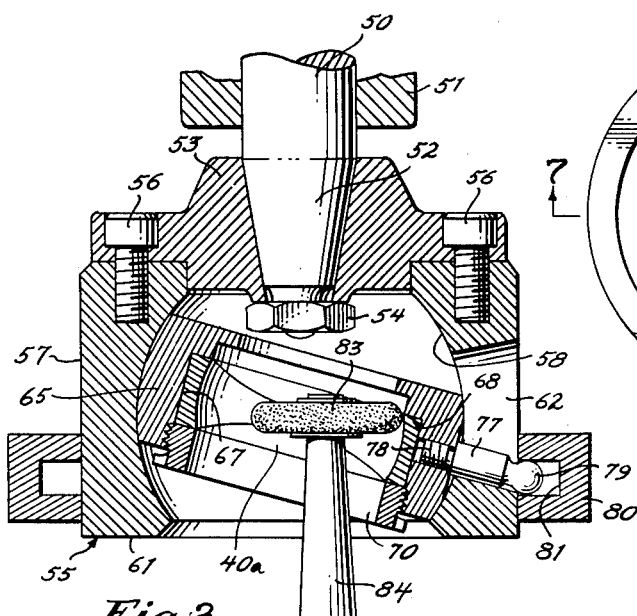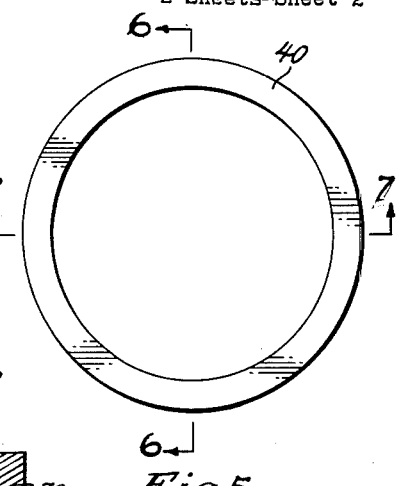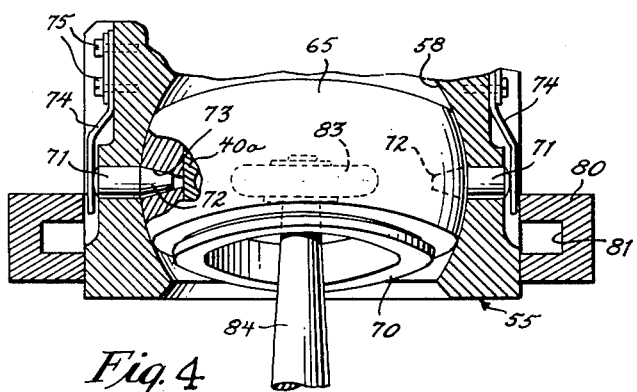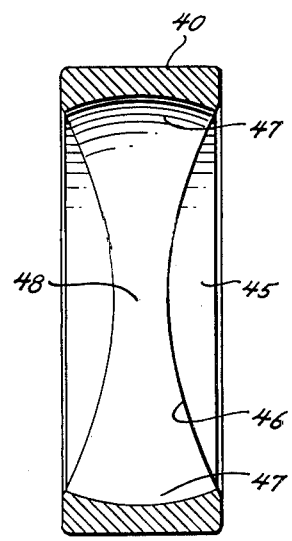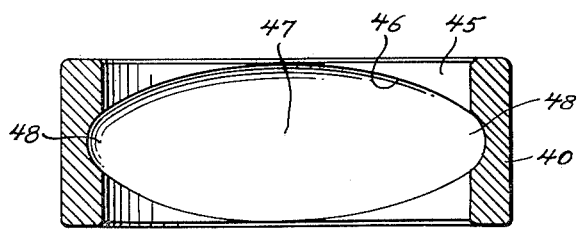

3,031,808
APPARATUS FOR MANUFACTURING BEARING RACES AND THE LIKE
Attilio R. Spicacci, Germantown Manor, Greene and Hortter Sts., Philadelphia, Pa.
Original application Feb. 6, 1959, Ser. No. 791,629, now Patent No. 2,971,387, dated Feb. 14, 1961. Divided and this application Nov. 2, 1959, Ser. No. 850,228
1 Claim. (Cl. 51—237)

This invention relates generally to novel apparatus for manufacturing bearing races and the like. This application is a division of my copending patent application Serial No. 791,629, filed February 6, 1959 which has issued as Patent No. 2,971,387, dated February 14, 1961.

It is a general object of this invention to provide a unique and highly advantageous apparatus for manufacturing bearing races, including races for bearings of the type disclosed in the above-mentioned copending patent application.

It is another object of the present invention to provide apparatus for use in the manufacture of bearing races which is extremely simple in construction and operation, entirely reliable in use, and which is adapted to effect substantial economies in production.

The instant invention further contemplates the provision of apparatus having the advantageous characteristics mentioned in the preceding paragraphs, which is capable of generating bearing-race grooves of the type disclosed in said copending patent application and having a wide range of dimensions.

Other objects of the present invention will become apparent upon reading the following specification and referring to the accompanying drawings, which form a material part of this disclosure.

The invention accordingly consists in the features of construction, combinations of elements and arrangements of parts, which will be exemplified in the construction hereinafter described, and of which the scope will be indicated by the appended claim.

In the drawings:

FIGURE 3 is a sectional view similar to FIGURE 1 illustrating the instant apparatus in another stage of its operation;

FIGURE 4 is a view taken from the left of FIGURE 3 partially illustrating the apparatus thereof, and partly in section to show certain structural elements;

FIGURE 5 is an elevational view showing an annular bearing elements or outer race adapted to be manufactured by the instant apparatus;

FIGURE 6 is a sectional view taken substantially along the line 6—6 of FIGURE 5; and FIGURE 7 is a sectional view taken substantially along the line 7—7 of FIGURE 5.

Figures 1, 2:
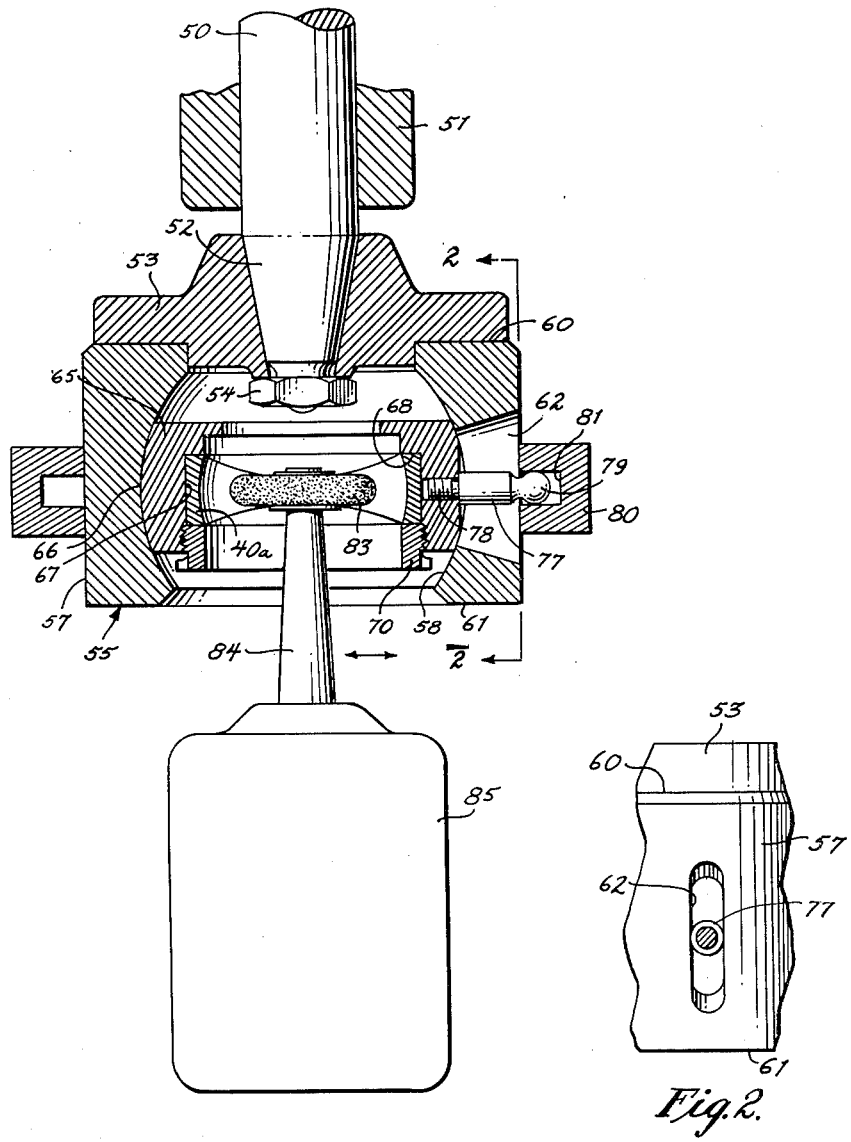
FIGURE 1 is a longitudinal sectional view illustrating the apparatus of the present invention for manufacturing bearing races, in one stage of bearing manufacture.
FIGURE 2 is a partial sectional view taken substantially along the line 2—2 of FIGURE 1 illustrating a detail of the manufacturing apparatus.

While the particular bearing-race construction adapted to be manufactured by the instant apparatus is not a part of the instant invention, being disclosed and claimed in said copending patent application, a brief description herein of the race construction will facilitate complete understanding of the subject apparatus. The race or annular bearing element is shown in FIGURES 5–7 and there illustrated as an external bearing element 40. On its inner periphery or internal surface 45, the race 40 is provided with a specifically contoured groove 46 for receiving and for bearing reception with intermediate bearing elements or balls (not shown). The internal, annular groove 46 of the outer race 40 is configured to have alternately narrow and wide regions merging smoothly with each other, the wide and narrow regions each being two in number, so that the groove may be generally considered as an hourglass shape in development, say if the configuration were developed in a plane starting from one narrowmost region. Further, the relatively wide pair of groove regions, designated 47, are located in diametrically opposed relation along the section line 6—6, while the relatively narrow pair of groove regions, designated 48, are located in diametrically opposed relation along the section line 7—7. Thus, the adjacent wide and narrow regions of groove 46 are spaced apart approximately ninety degrees from each other. The cross-sectional configuration of the relatively narrow groove portions 48 may be such as to conformably receive outer portions of intermediate roller-bearing elements or balls, say having substantially the same radius of curvature as the received balls, while the relatively wide groove portions 47 have a radius of curvature in cross section approximately equal to the maximum internal radius of the outer race, such radius lying in a central plane of the outer race in the illustrated embodiment. Between these regions of maximum and minimum groove width, the radius of curvature in cross section varies gradually and continuously between its maximum at the relatively wide groove regions and minimum at the relatively narrow groove regions, this being another way of defining the configuration of the internal annular groove 46.

The apparatus of the instant invention, for manufacturing the hereinbefore described race 40, is shown in FIGURES 1–4. In particular, FIGURE 1 illustrates an axially rotatable work spindle 50 supported in a journal bearing 51 and overhanging the latter, having its overhanging region 52 outwardly tapered. A centrally apertured faceplate 53 is circumposed about and seated on the spindle portion 52, being clamped thereon by a locknut 54 threaded on the distal end of the work spindle.

A generally annular member or chuck 55 is carried by the plate 53 for rotation therewith about the axis of the work spindle 50, and clamped to the plate by fasteners 56, see FIGURE 3. The chuck 55 is generally concentric with the work spindle 50, having a generally cylindrical outer surface 57 coaxial with the work spindle, and a generally spherical internal surface 58 having its center of curvature along the work-spindle axis. Thus, the annular chuck 55 is generally concentric with the work spindle 50, having its inner- and outer-side faces 60 and 61 substantially parallel to each other and normal to the work-spindle axis, with the inner-side face or surface 60 bearing against the plate 53, and the outer surface 61 facing outward away from the plate and having a central opening communicating with the interior of the chuck. A slot 62 is formed in the annular chuck 55 extending longitudinally thereof spaced medially between the inner and outer surfaces 60 and 61. Thus, the slot 62 extends generally parallel to the axis of spindle 50, and lies in a plane containing said axis.

Interiorly of the annular outer chuck member 55 is an annular inner chuck member or workholder 65. The annular workholder 65 has its outer surface 66 generally spherical for conforming and relative sliding engagement with the spherical internal surface 58 of the outer chuck member. The center of curvature of the spherical outer surface 66 lies on the axis of the central through opening 67 of the annular member 65; and, an internal shoulder 68 is provided in the opening 67. The central opening 67 of the annular workholder 65 is adapted to receive an annular workpiece 40a with one side of the workpiece bearing against the internal shoulder 68, and to be clamped in position thereagainst by a clamping ring 70 threaded into the opening 67. By the instant apparatus, the workpiece 40a is adapted to be formed into the outer race 40 described hereinbefore.

In a plane at approximately ninety degrees with respect to the plane of slot 62 formed in the chuck member 55, there are provided a pair of aligned pivot pins 71, see FIGURE 4, extending radially inward through diametrically opposed regions of the chuck member 55 and entering into diametrically opposed regions of the workholder 65. The pins 71 have their inner-end regions 72 of conical configuration, each being conformably received in a conical, generally radially disposed bore 73 of the annular inner member 65, thereby constraining the latter member to pivotal movement relative to the outer member 55 about a diametral axis defined by the aligned pins 71. That is, the internal annular member 65 is rotatable with the outer member 55 about the axis of work spindle 50, and pivotable relative to the member 55 about the axis of the aligned pins 71. Such pins may be removably held in position by resilient retainer elements 74 secured to the outer member 55 by fasteners 75, and located in external recesses of the outer member so as to lie entirely beneath the cylindrical external surface thereof 57.

An arm 77, see FIGURES 1 and 3, may be fixed to the internal annular member 65, as by a threaded connection 78, and projects radially outward from the internal annular member through and beyond the slot 62, where it is provided with a head 79, preferably of generally spherical configuration. An internally grooved annular guide member 80 is circumposed slidably about the exterior of the outer chuck member 55, and formed with an internal annular channel 81 slidably receiving the head 79 of the arm 77 by any suitable means (not shown), the annular guide member 80 is adapted to be moved longitudinally of the chuck member 55 while the latter is axially rotating.

A working tool 83 is shown in position interiorly within the internal annular chuck member or workholder 65, being carried by a shaft 84 connected to a power-transmission device 85 exteriorly of the chuck member 55. The illustrated working tool 83 is a toroidal grinding tool, rotatable with the shaft 84, but any suitable metal-working tool may be similarly employed, as will appear presently. The working tool 83, as by its power transmission 85, is mounted for axial movement into and out of position within the workholder 65, and there movable radially into and out of engagement with the internal surface of the workpiece 40a.

In operation, the spindle 50 is axially rotated to effect axial rotation of the plate 53, outer and inner chuck members 55 and 65, and of the annular workpiece 40a. Simultaneously, the annular internal channel or guide 80 is moved axially to effect an oscillating rotary motion of the internal annular member or workholder 65, together with the workpiece 40a relative to the axially rotating outer member 55. While the speed of rotation of the spindle 50 is contemplated as being high relative to the frequency of reciprocation of the guide member 80, so that the complete internal groove 46 as described hereinbefore will definitely be formed, it may under certain circumstances be desirable to properly time said rotation and reciprocation in an out-of-phase relationship to insure complete formation of the desired internal-groove configuration.

The workpiece 40a is thus simultaneously axially rotated and oscillated about a diameter thereof. If the working tool 83 is then moved into engagement with the internal surface of the workpiece 40a, the hereinbefore described internal-grooved configuration is formed. For symmetry of formation of the groove 46 in the workpiece 40a, it is desirable that the workpiece be located symmetrically with respect to the oscillatory privotal axis of pins 71, and that the working tool 83 also be located symmetrically with respect to such axis.

The grinding wheel or tool 83 is preferably of a toroidal configuration having its peripheral or working surface of a cross section with a radius of curvature substantially equal to the radius of curvature of the intermediate bearing elements or balls to be used with the finished race 40. Thus, the relatively narrow regions 48 of the groove 46 will conformably receive the balls, while the relatively wide groove regions 47 will be in bearing contact at any point in their width with the balls.

After the grooved configuration 46 has been formed to a satisfactory depth, it is only necessary to radially withdraw the working tool 83 from engagement with the workpiece 40a, and thence axially withdraw the working tool from the chuck member 55. Of course, the workpiece 40a may be removed from the workholder 65 by mere removal of the clamping ring 70.

It will now be appreciated that the instant apparatus provides a highly efficient and advantageous means for manufacturing the outer bearing race 40 and producing therein the specifically configured groove 46. Further, it is now understood, especially in conjunction with said copending patent application, that the outer bearing race 40 may be combined with a conventional inner bearing race and intermediate rollable bearing elements or grooves, whereby the groove 47 is cross sectionally configured at one diameter to substantially conform with the bearing surfaces of the rollable elements or balls and cross sectionally configured at all other diameters to afford substantial relative angular movement between the annular bearing elements about said one diameter while maintaining the rollable elements in bearing engagement with the annular elements.

From the foregoing, it is seen that the present invention provides an apparatus for manufacturing bearing races and the like which fully accomplishes its intended objects and is well adapted to meet practical conditions of manufacture and use.

Although the present invention has been described in some detail by way of illustration and example for purposes of clarity of understanding, it is understood that certain changes and modifications may be made within the spirit of the invention and scope of the appended claim.

What is claimed is:

Apparatus for manufacturing bearing races and the like, said apparatus comprising an axially rotatable internal chuck member, an annular workholder mounted interiorly of said chuck member for rotation therewith and pivotal movement relative thereto about an axis normal to the axis of said chuck member, clamping means on said workholder for releasably securing an annular workpiece to said workholder axially thereof, and means for pivotally moving said workholder during rotation thereof with said chuck member, said moving means, comprising an arm extending from said workholder generally normal to the axis of rotation of said chuck member and normal to the axis of pivotal movement of said workholder and terminating exteriorly of said chuck member, said arm being swingable with said workholder about its axis of pivotal movement, and a guide slidably engageable with the distal end of said arm and mounted for movement longitudinally of the axis of said chuck member for locating said arm and workholder in any selected position of said pivotal movement.

References Cited in the file of this patent

UNITED STATES PATENTS

| | | |
|---|---|---|
| 1,756,014 | Streby | Apr. 29, 1930 |
| 1,854,618 | McGrady | Apr. 19, 1932 |
| 2,591,298 | Roux | Apr. 1, 1952 |